INVENTORS
CARL D. PETERSON
AND ALBERT H. DEIMEL
BY
ATTORNEYS

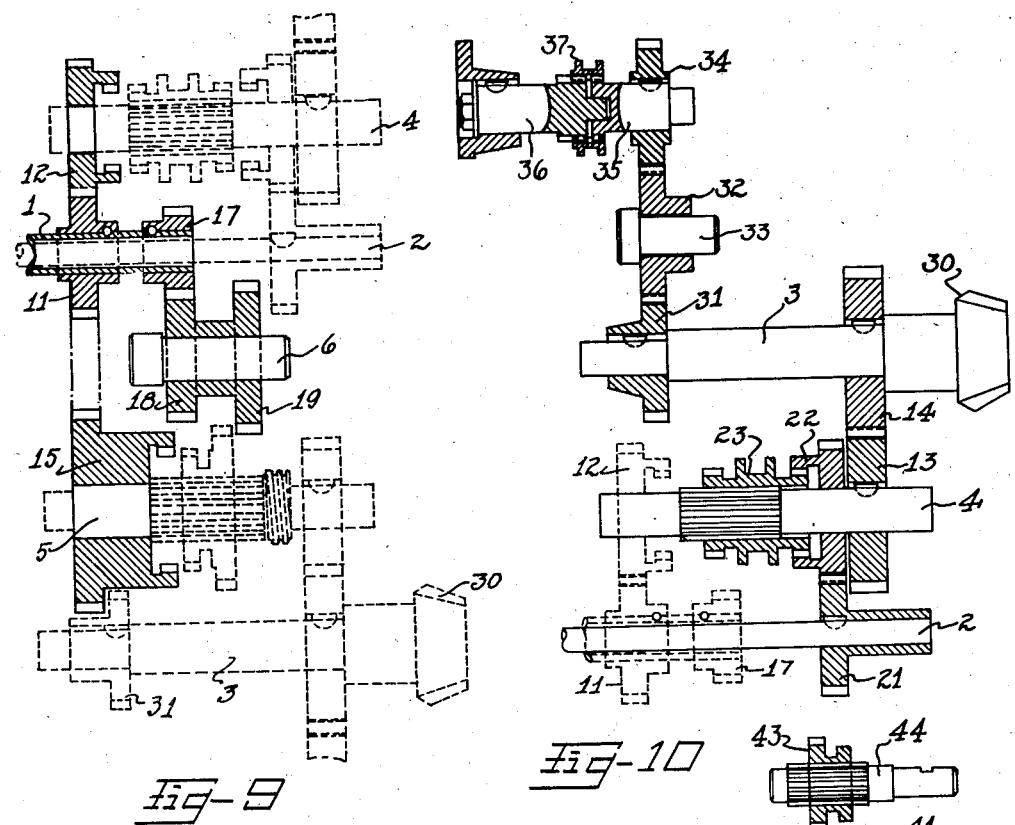

Patented Aug. 15, 1950

2,519,279

UNITED STATES PATENT OFFICE 2,519,279

TRANSMISSION MECHANISM

Carl D. Peterson and Albert H. Deimel, Toledo, Ohio, assignors to Dana Corporation, Toledo, Ohio, a corporation of Virginia Application November 9, 1944, Serial No. 562,658

2 Claims. (Cl. 74—330)

This invention relates to change-speed transmission gearings, particularly for use with hydraulic or torque converters or multipliers, and has for its object an especially short, compact arrangement of the gears and clutches. It further has for its object such a compact gear construction for driving both the front and rear axles of a motor vehicle with the drive through lower gear ratios from an engine actuated input shaft through a torque converter and in the higher gear ratio through the input shaft connected directly to the engine and concentric with the former input shaft.

The invention consists in the novel features and in the combinations and constructions hereinafter set forth and claimed.

In describing this invention, reference is had to the accompanying drawings, in which like characters designate corresponding parts in all the views.

Figure 1:
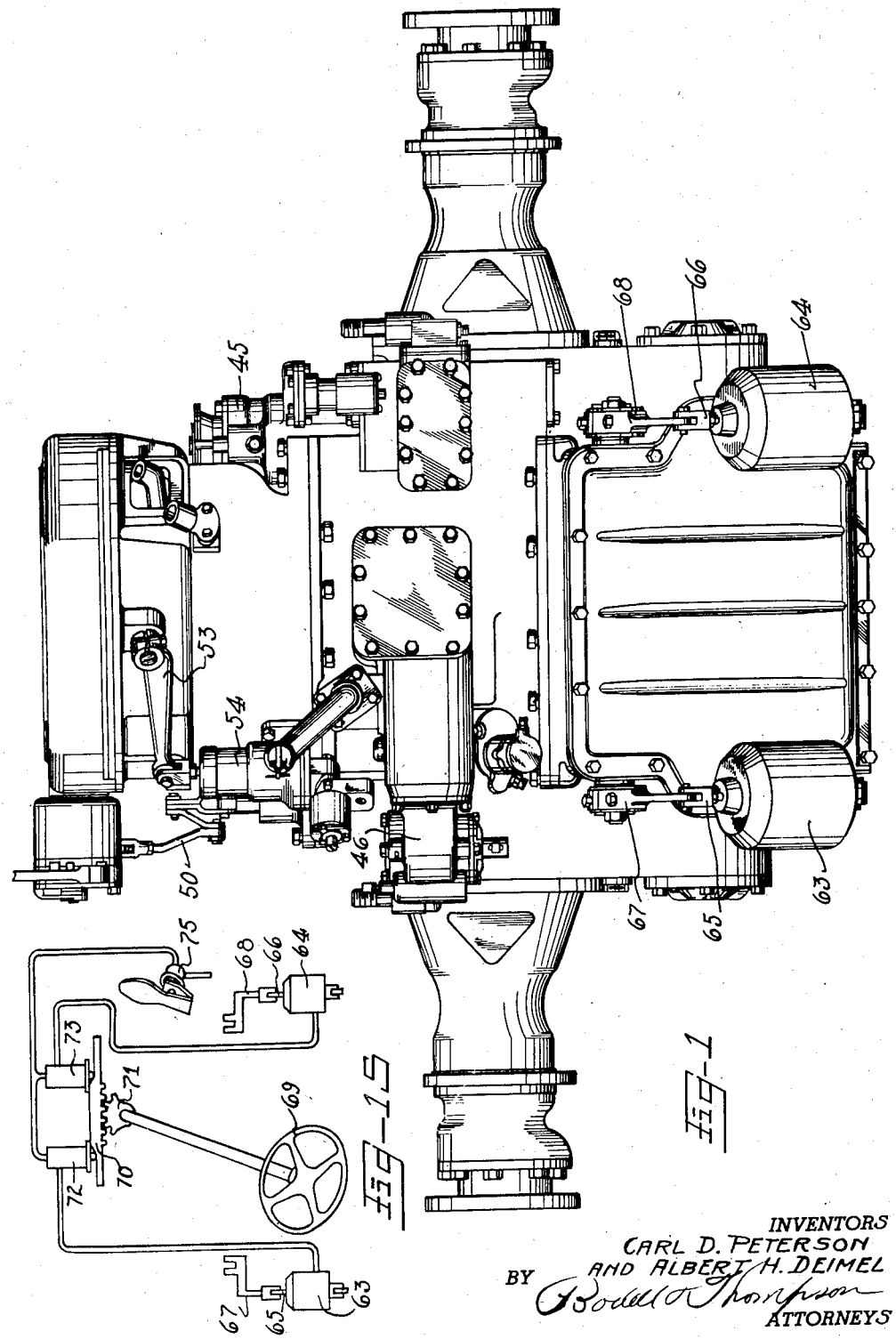
Figure 1 is a plan view of this gearing and contiguous parts.

Figures 5 to 12 inclusive are diagrammatic views showing the power paths of the various gear ratios.

Figure 13 is a longitudinal sectional view with the power take off gearing drive.

Figure 14 is an enlarged longitudinal sectional view of the front wheel drive.

Figure 15 is a diagrammatic view of the steering control.

This gearing is of the same type as shown in our application, Serial Number 497,839, filed August 7, 1943, now Patent No. 2,397,883, dated April 2, 1946, in which the drive is through a torque converter for lower gear ratios and the direct or the high speed drive or what corresponds to direct drive, through a jaw clutch. The drives through the lower gear ratios, for brevity's sake, are identified as converter drives.

This transmission mechanism includes, generally, an input shaft, an output shaft, a pair of countershafts, trains of gears between said shafts including a clutch operable to connect in driving relation the input shaft to the output shaft through gears on one only of the countershafts, and another clutch operable to connect the input shaft and the output shaft through gears on the other countershaft. As the input shaft consists of two elements or sections, one of which is driven through a torque converter or other instrumentality operating to multiply torque and the other directly by the engine, each of these two sections in itself constitutes an individual input shaft.

I designates the converter drive shaft, and 2 the direct drive shaft, these being concentrically arranged, the shaft I being a sleeve or hub on the runner of the converter and enclosing the shaft 2, as in said application referred to. This construction per se forms no part of the invention. The direct drive from the shaft 2 to the output shaft is through one countershaft only. The term "direct drive" is here used as direct drive from the engine rather than direct drive from an input shaft to the output shaft. The drive through the converter input shaft I is optionally through either countershaft.

As this invention relates to transmission mechanism, the manner in which the shafts I and 2 are actuated is of no consequence, in so far as this invention is concerned.

3 designates the output shaft; 4 and 5, countershafts, and 6, a reverse gear stud. The shaft 2 extends through the casing 7 and has a journal bearing at its rear end at 8 in the rear wall of the casing. The converter shaft I extends through the front wall of the gear box or casing 7 and has a journal bearing at 9 at its inner end midway between the front and rear walls of the gear box 7. An oil return screw is provided at 10 in the converter shaft I near the plane of the intermediate bearing 9. The output shaft 3 is mounted in suitable bearings in the front and rear side walls of the gear box 7, as are the countershafts 4 and 5. The trains of gears between the input shafts I and 2 and the output shaft 3 through the countershafts 4 and 5 are as follows: Gear II on the converter input shaft I, gear 12 on the countershaft 4, gear 13 on the countershaft 4, when the gear 12 is clutched to the countershaft (Figure 5) and gear 14 splined on the output shaft 3. This may be a one-to-one ratio behind the converter, as shown, or any desired comparatively high gear ratio.

A second train of gears includes the gear II, gear 15 on the countershaft 5, gear 16 on said countershaft, when the gear 15 is clutched to the countershaft 5 (Figure 7) and gear 14 on the output shaft 3. This is a low gear ratio through the converter. The gear 11 is thus common to two gear trains.

Reverse drive (Figure 8) is also through the countershaft 5. The reverse train includes the gear 17 on the input shaft 1 meshing with one gear 18 of a reverse spool mounted on the stud 6, the other gear 19 of said spool and the clutch gear 20, when shifted into mesh with the gear 19, and gears 16 and 14. The gear 20 is splined on the countershaft 5 and is part of a shiftable element to be presently described, operable in one direction from neutral to clutch the gear 15 to the countershaft 5 and in the opposite direction from neutral to shift the gear 20 into mesh with the reverse spool gear 19. The countershaft gear 16 is common to the low gear train and the reverse train.

The gear train between the direct drive input shaft 2 and the output shaft 3 includes a gear 21 splined on the shaft 2, a gear 22 on the counter shaft 4, when clutched thereto (Figure 6) and the gears 13 and 14 splined on the countershaft 4 and the output shaft 3 respectively. The gear 13 is thus common to two gear trains, one from the input shaft 1 through the gear 12 of the countershaft 4, and the other from the input shaft 2 and countershaft gear 22. The final drive gear 14 on the output shafts is common to all the gear trains.

23 and 24 designate shiftable elements or clutches operable to connect in driving relation the input shafts to the output shaft through the gear trains heretofore described. The clutch element 23 is operable in one direction, as to the left, from neutral to clutch the gear 12 to the countershaft 4, this operation being through a synchronizing mechanism, wherein the initial shift engages a friction synchronizing ring 25 with a cooperating friction member 230 on the gear 12 or connected thereto through a one-way overrunning clutch. Full shifting movement engages clutch teeth 26 of the clutch element 23 with complemental clutch teeth on the friction member 230. The synchronizing clutch and/or the overrunning feature forms no part of the invention. The clutch element 23 is shiftable in the opposite direction, or to the right from neutral, to clutch the gear 22 to the countershaft through balking ring clutch mechanism designated generally 27. The balking ring clutch mechanism per se forms no part of the invention.

The shiftable element 24 splined on the countershaft 5 is shiftable in one direction, as to the left from neutral, to engage clutch teeth 28 thereon with complemental clutch teeth on the element 29 or a part or collar 29 rotatable in one direction therewith through a one-way overrunning roller clutch. The shiftable element 24 is shiftable in the opposite direction, as to the right from neutral, to shift the gear 20, which is integral therewith into mesh with the gear 19 of the reverse spool. The overrunning clutches permit the countershafts 4 and 5 to run faster than the gears 12, 15, when the shafts are being actuated in a higher gear ratio, and hence avoid driving the gears 12 and 15.

The output shaft 3 is connected to the rear drive axle of the vehicle, which may be a track or wheel type vehicle, and is here shown as provided with a bevel pinion 30 meshing with the ring gear of the differential gearing. The front steering wheels of the vehicle are driven from the front end of this output shaft 3 through gearing which may be optionally connectable to the output shaft 3 and consists of a gear 31 mounted on the left hand end of the output shaft 3 (Figure 14) within the gear casing 7 meshing with the gear 32 journalled on a spindle 33 mounted in a wall of the gear box, and a gear 34 mounted on a shaft 35 in the casing and clutchable to an axially alined shaft 36 extending forwardly and having means at its front end for coupling through a propeller shaft to front wheel drive mechanism. 37 designates a clutch operable to connect and disconnect the shaft 36 from drive from the output shaft 3 through the gears 31, 32 and 34. The clutch 37 is shiftable by a suitable lever connected to a shift rod 370 (Figure 3) having a fork 371 working in a groove in the hub of the clutch 37.

Figure 3:
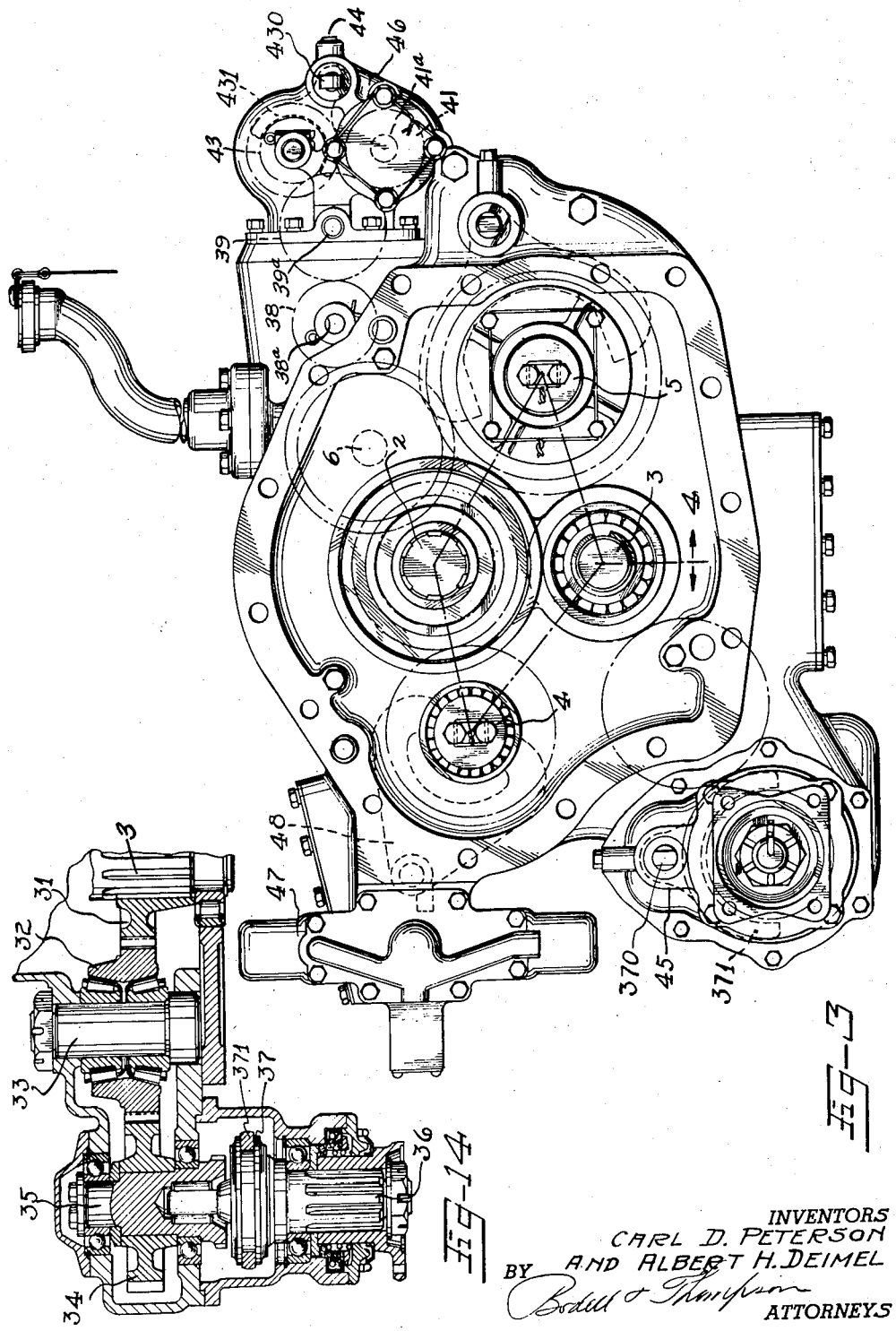
Figure 3 is a front elevation of the transmission gearing itself looking to the right in Figure 2, the housing for the converter and its clutch mechanism being removed.
Figure 4:
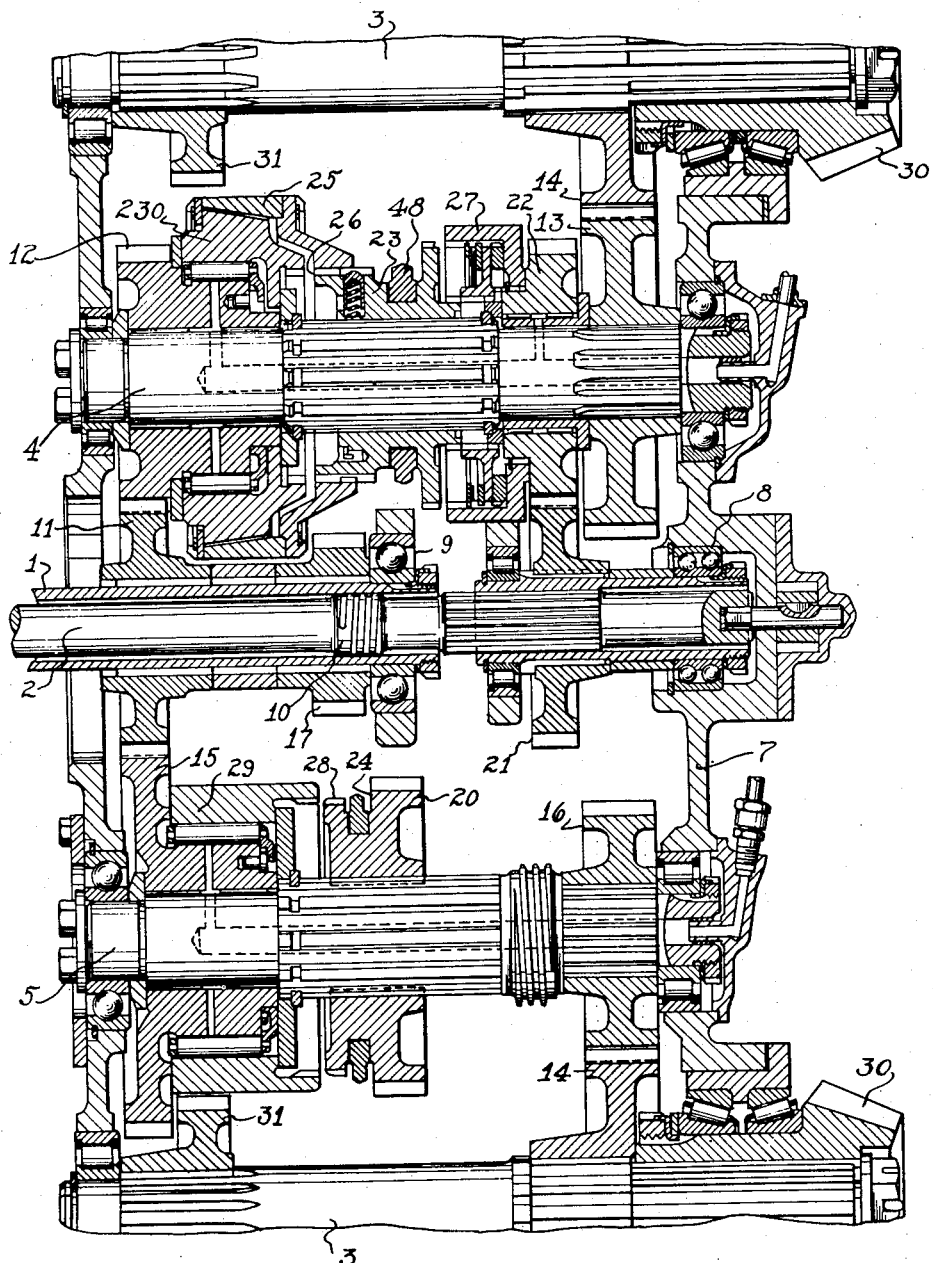
Figure 4 is a developed view on a section line through the output shaft, or a sectional view on line 4—4, Figure 3.
Figure 5:
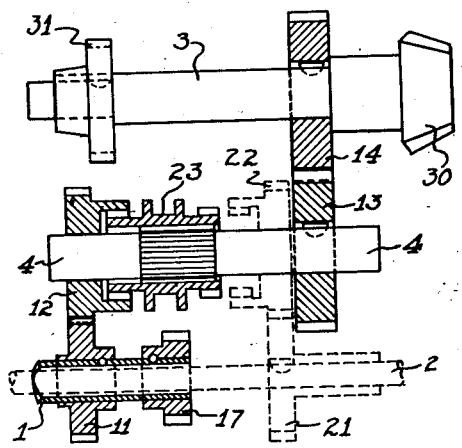
Figure 6:
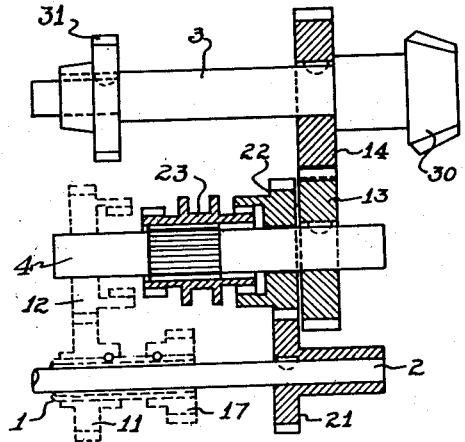
Figure 7:
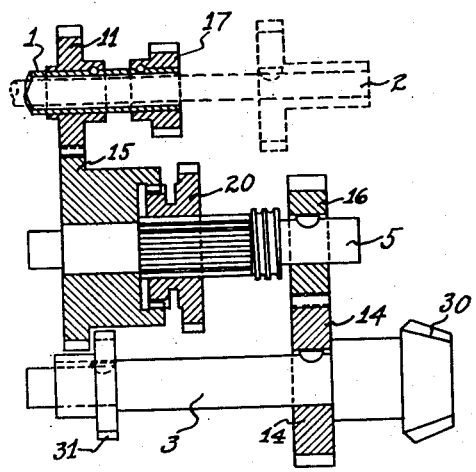
Figure 8:
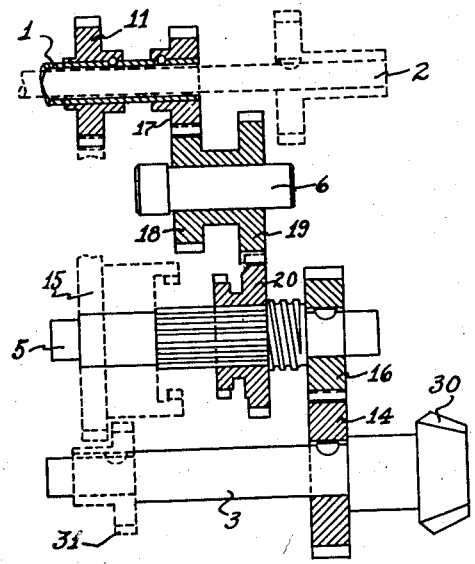

A power take off is also preferably provided, this being driven from the reverse gear spool consisting of gears 18, 19 (Figures 11 and 13), as this spool is normally idly rotating with the converter shaft or the input shaft 1. The power take off includes a pinion 38 meshing with the gear 19 of the reverse spool and also with a gear 39 of a double gear, the other gear 40 of which meshes with the gear 41 of a double gear, the other gear 42 of which meshes with a shiftable gear 43 on the tail shaft 44 of the power output gearing, the gear 43 being shiftable axially into and out of mesh with the gear 42, so that the power take off can be used optionally when the transmission gearing is in neutral position, that is, when the clutch 20 on the countershaft 5 is in neutral position. It is shifted by a lever connected to a shift rod 430 (Figure 3) having a fork 431 working in a groove in the hub of the gear 43. The gear 38 is mounted on spindle 38ª, the gears 39, 40 on spindle 39ª, and the gears 41 and 42 on spindle 41ª. The arrangement of the reverse gear, as to the spindles 38ª, 39ª, 41ª and power take off shaft 44 is shown diagrammatically in straight line in Figures 11 and 13, but are actually arranged as shown in Figure 3. The shiftable gear 43 is shiftable in opposite directions from neutral to produce forward and reverse speed in the power take off shaft. These positions are indicated by the three notches in the shift rod 430 and a single spring-pressed poppet coacting with these notches normally arranged in the central notch. When shifted from neutral in one direction, the gear 43 meshes with gear 42, and in the opposite direction, with the gear 40.

The front wheel drive gearing is mounted in a suitable casing 45 attachable to the main gear box and also the power take off gearing is mounted in a suitable casing 46 applicable to the main gear box.

Figure 2:
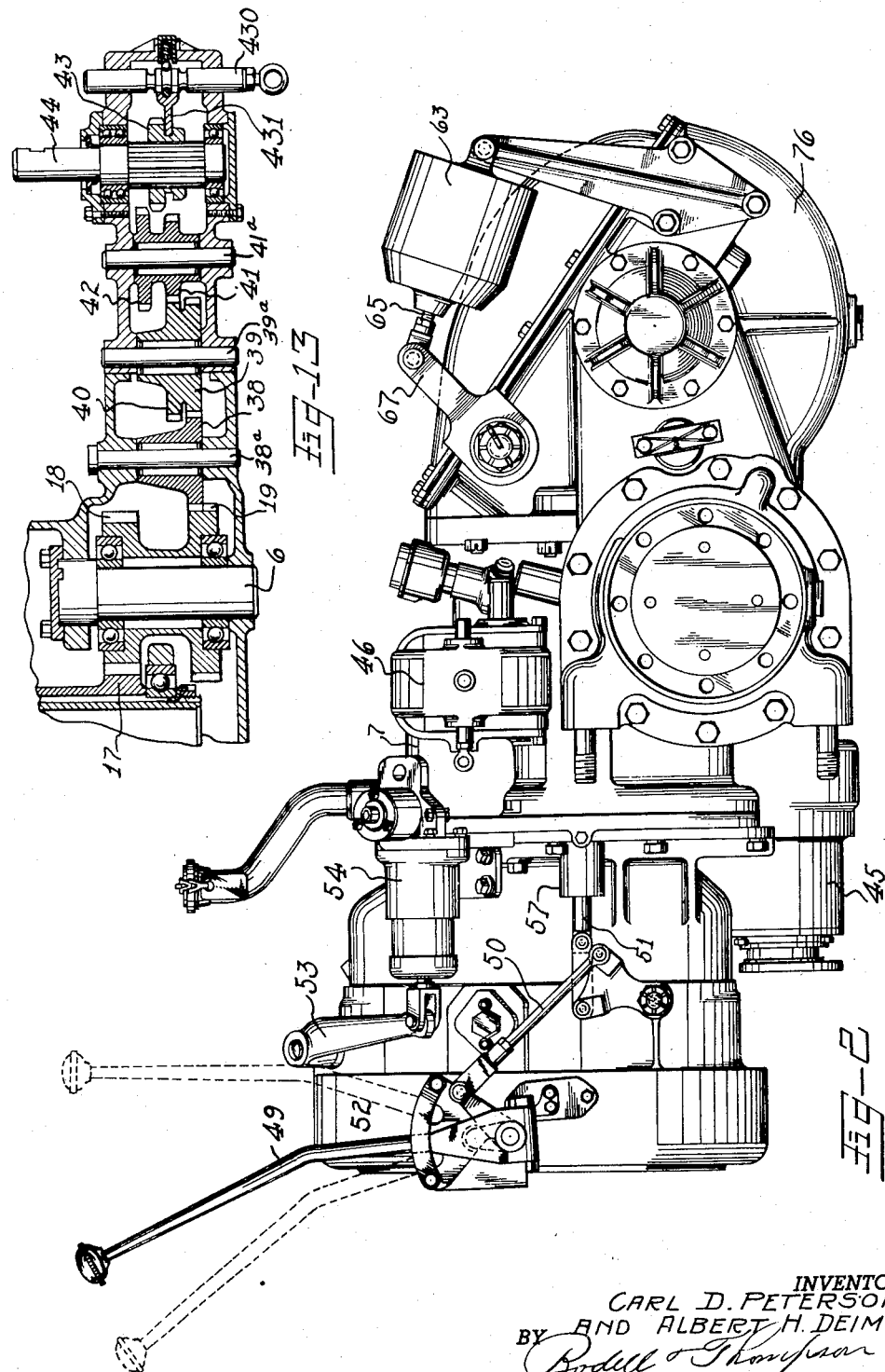
Figure 2 is a side elevation of parts seen in Figure 1.

The clutch element 23 may be shifted in any suitable manner or by any suitable mechanism, as by hand or normally by power, and in emergency cases by hand. The shifting mechanism forms no part of this invention. The clutch element may be operated by power mechanism designated generally 47 including opposing cylinders having pistons acting on a rod to which is connected an arm on the fork 48 (Figure 3). The flow of motive fluid, as air, to and from the cylinders may be controlled in any suitable manner. When one cylinder is energized, the fork 48 is shifted in one direction from central position, and when the other cylinder is energized, the fork is shifted in the other direction from central position. The clutch element 24 is preferably manually operated to effect forward and reverse, as by a lever 49 (Figure 2) connected by linkage 50 to a shift rod 51 for the fork of the clutch element 24. The lever 49 and linkage 50 are mounted on the side of the housing 52 for the converter and clutch mechanism therefor. 53 is a lever forming part of the operating mechanism for shifting the clutch operable to cut out the impeller of the converter, when the drive is through the shaft 2, this lever being operated by power, as a cylinder and piston motor 54, the rod of which is connected to the lever 53. The control of the shifting mechanism including the lever 53, cylinder and piston, and the control of motive fluid to and from the cylinder 54 forms no part of this invention.

For the purpose of facilitating the steering of heavy vehicles by augmenting the effect of the front steering wheels, power means controlled by the operation of the hand steering wheel is here shown for holding one side gear or the other of the differential from operating, when the hand steering wheel is to turn the front ground wheels. This may be effected by applying a brake band 55 or 56 (Figure 12) to a drum 57 or 58 mounted concentric with the axle shaft sections 61, 62, respectively, and having gear teeth 570, 580 meshing with pinions 571, 572 mounted on spindles suitably mounted in the casing of the differential, the spindles also having pinions 573, 574 meshing with the side gears 59, 60 of the differential. The differential gearing may be of any suitable construction and is of the compensating type, so that when one of the brake bands 55, 56 is applied to its companion brake drum 57 or 58, the motion is transmitted from the retarded side of the gearing or differential to the other side of the differential in proportion to the degree to which one side is retarded. The brake bands are contracted on the brake drums by the operation of pistons within cylinders 63, 64, the rods 65, 66 of the pistons being connected to rock arms 67, 68 (Figure 15) on suitable brake band contracting mechanism of any well known construction. The flow of motive fluid or air to the cylinders 63 or 64 is controlled by the operation of the hand steering wheel 69, which through suitable mechanism, as a slide 70, having a rack which meshes with a sector 71 on a steering post, operates to open a left or right valve 72, 73, in accordance with the direction in which the wheel 69 is turned, and to permit air to flow into the cylinders 63 or 64 when the operator wills, as by operating an operator-operated or foot-operated valve 75 in the feed lines to the valves 72, 73. The cylinders and pistons 63, 64 are mounted on suitable brackets on the rear axle casing 76.

The front wheels are steered by the hand power applied to the steering wheel 69 and the steering of the vehicle is facilitated by the power operated means just described, controlled by the control members or valves 72, 73, the power mechanism also being in the control of the operator through the pedal operated control member or valve 75. For an ordinary straightaway steering, the wheels, that is, the front wheels operated by the hand steering wheel 6 only are used, but for turning corners and maneuvering, the half tracks are used for steering as by retarding one, leaving the other free to roll by operating the pedal operated valve 75, when the hand steering wheel is turned to the right or to the left out of central position. As the power is controlled at the will of the operator by the pedal operated valve 75, either half track or its axle shaft section 61 or 62 is held restrained only as long as the pedal operated valve 75 is held depressed when the hand steering wheel 69 is turned to the right or left from central position.

What we claim is:

1. In a transmission gearing, concentric input shafts, an output shaft, a pair of counter shafts, trains of gears between the input shafts and the output shaft through gears on the counter shafts including a shiftable element operable into one position to connect one input shaft to the output shaft through gears on one of the counter shafts and into another position to connect the other input shaft to the output shaft through gears on said one of the counter shaft, a second shiftable element operable to connect one of the input shafts to the output shaft through the other counter shaft, and reverse gears operable in connection with one of the former gear trains in connection with the gears on said other counter shaft, the second shiftable element being shiftable in one direction from neutral to connect said other counter shaft and the output shaft in a forward gear train, and in the other direction from neutral into the reverse gear train, said gear trains having a final drive gear in common on the output shaft.

2. In a transmission gearing, concentric input shafts, an output shaft, a pair of counter shafts, trains of gears between the input shafts and the counter shafts and between the counter shafts and the output shaft, said trains having gears in common and a final drive gear on the output shaft common to all the trains, and shiftable means operating to connect any one train of gears in driving relation, the gears of the trains meshing with the final drive gear on the output shaft common to all the trains, being permanently in mesh with said final drive gear.

CARL D. PETERSON.
ALBERT H. DEIMEL.

REFERENCES CITED

The following references are of record in the file of this patent:

UNITED STATES PATENTS

| Number | Name | Date |
|---|---|---|
| 1,724,202 | Jacobs | Aug. 13, 1929 |
| 1,795,368 | Lindner | Mar. 10, 1931 |
| 1,905,145 | Carter | Apr. 25, 1933 |
| 2,155,434 | Marsh | Apr. 25, 1939 |
| 2,205,300 | Marsh | June 18, 1940 |
| 2,315,808 | Miller | Apr. 6, 1943 |
| 2,375,959 | Stolte | May 15, 1945 |
| 2,378,082 | Hood | June 12, 1945 |
| 2,379,628 | Eberhard et al. | July 3, 1945 |
| 2,386,540 | Campodonico | Oct. 9, 1945 |
| 2,386,541 | Campodonico | Oct. 9, 1945 |